(12) United States Patent
Szczesny et al.

(10) Patent No.: US 9,800,132 B2
(45) Date of Patent: Oct. 24, 2017

(54) SYSTEMS AND METHODS FOR CONTROLLING A PLURALITY OF POWER SEMICONDUCTOR DEVICES

(71) Applicant: General Electric Company, Schenectady, NY (US)

(72) Inventors: Paul Michael Szczesny, Clifton Park, NY (US); Rajib Datta, Niskayuna, NY (US); Fengfeng Tao, Clifton Park, NY (US); Jian Dai, Schenectady, NY (US); Xu She, Clifton Park, NY (US); Tannous Frangieh, Waterford, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 14/982,975

(22) Filed: Dec. 29, 2015

(65) Prior Publication Data

US 2017/0187277 A1 Jun. 29, 2017

(51) Int. Cl.
H03K 17/687 (2006.01)
H02M 1/088 (2006.01)

(52) U.S. Cl.
CPC .................. H02M 1/088 (2013.01)

(58) Field of Classification Search
None
See application file for complete search history.

(56) References Cited

U.S. PATENT DOCUMENTS

| 5,365,397 A | 11/1994 | Kadota |
| 5,497,263 A | 3/1996 | Masuda et al. |
| 6,480,403 B1 | 11/2002 | Bijlenga |
| 6,842,033 B1 | 1/2005 | Kim et al. |

(Continued)

FOREIGN PATENT DOCUMENTS

| CN | 104506259 A | 4/2015 |
| JP | H09197010 A | 7/1997 |
| WO | 2004006037 A2 | 1/2004 |

OTHER PUBLICATIONS

Serster, C.; "Fast high-power/high-voltage switch using series-connected IGBTs with active gate-controlled voltage-balancing"; Applied Power Electronics Conference and Exposition, 1994. APEC '94. Conference Proceedings 1994., Ninth Annual, vol. 1, pp. 469-472, Feb. 13-17, 1994, Orlando, FL.

(Continued)

Primary Examiner — Lincoln Donovan
Assistant Examiner — Khareem E Almo
(74) Attorney, Agent, or Firm — Pabitra K. Chakrabarti

(57) ABSTRACT

A power conversion system may include a plurality of power devices and a sensor operably coupled to at least one of the plurality of power devices and configured to detect a voltage, current, or electromagnetic signature signal associated with the plurality of power devices. The power converter may also include circuitry operably coupled to the plurality of power devices and the sensor. The circuitry may send a respective gate signal to each respective power device of the plurality of power devices, such that each respective gate signal is delayed by a respective compensation delay that is (Continued)

determined for the respective power device based on a respective time delay of the respective power device and a maximum time delay of the plurality of power devices.

19 Claims, 5 Drawing Sheets

(56) References Cited

U.S. PATENT DOCUMENTS

| | | | |
|---|---|---|---|
| 7,923,977 | B2 | 4/2011 | Huang |
| 8,125,261 | B2 | 2/2012 | Nomura |
| 8,446,206 | B2 | 5/2013 | Alvarez Valenzuela et al. |
| 8,471,604 | B2 | 6/2013 | Permuy et al. |
| 8,713,344 | B2 | 4/2014 | Oh |
| 9,231,504 | B2 * | 1/2016 | Fuller .................. H02P 6/10 |
| 2008/0133165 | A1 | 6/2008 | Iwamoto et al. |
| 2011/0090720 | A1 | 4/2011 | Fujii |
| 2014/0232196 | A1 * | 8/2014 | Cameron ............. G05F 1/67 307/82 |
| 2015/0280608 | A1 * | 10/2015 | Yoscovich ............ H02M 7/483 363/131 |
| 2016/0087623 | A1 * | 3/2016 | Yamaguchi .......... H03K 17/161 327/109 |
| 2016/0118977 | A1 | 4/2016 | Yi et al. |

OTHER PUBLICATIONS

Baraia, I., et al.; "An Experimentally Verified Active Gate Control Method for the Series Connection of IGBT/Diodes"; Power Electronics, IEEE Transactions, vol. 27, Issue 2, pp. 1025-1038, Feb. 2012.

Alvarez, R., et al.; "Delay time compensation for parallel connected IGBTs: Implementation and extension for n IGBTs"; Power Electronics and Applications (EPE'14-ECCE Europe), 2014 16th European Conference on, pp. 1-10, Aug. 2014.

International Search Report and Written Opinion issued in connection with corresponding PCT Application No. PCT/US2016/068890 dated Apr. 21, 2017.

* cited by examiner

SYSTEMS AND METHODS FOR CONTROLLING A PLURALITY OF POWER SEMICONDUCTOR DEVICES

BACKGROUND

The subject matter disclosed herein relates to power conversion systems. More specifically, the present disclosure generally relates to controlling the switching of a number of power electronic devices in a power conversion system to improve its performances.

Wide band gap semiconductors, such as silicon carbide (SiC) and gallium nitride (GaN), are increasingly being used in power electronic devices, such as metal—oxide—semiconductor field-effect transistor (MOSFETs). Wide band gap power electronic devices generally have relatively low switching losses at relatively high switching rates (e.g., kilohertz (kHz) to Megahertz (MHz) range), operate at relatively high junction temperatures, and operate at relatively high voltages as compared to other power electronic devices that do not employ wide band gap semiconductor within the respective device. As such, wide band gap power electronic devices have gained interest in recent years in view of their switching performance and high temperature operation capabilities.

It may also be appreciated that commercial power conversion systems may include tens or hundreds of power electronic devices that cooperate to convert electrical power from one form to another, and that even minor mismatches in the timing of the switching operations of the power electronic devices can dramatically degrade the performance of the overall system. It may further be appreciated that the switching operations of the power electronic devices may be mismatched as a result of variability between two different power electronic devices at the time of manufacturing and/or as a result of changes in the switching behavior of a power electronic device over its operational lifetime.

BRIEF DESCRIPTION

In one embodiment, a power converter may include a plurality of power devices and a sensor operably coupled to at least one of the plurality of power devices and configured to detect a voltage, current, and/or electromagnetic (EM) signature signals associated with the plurality of power devices. The power converter may also include a circuitry, for example, such as a processor, operably coupled to the plurality of power devices and the sensor. The processor may send a respective gate signal to each respective power device of the plurality of power devices, such that each respective gate signal is delayed by a respective compensation delay that is determined for the respective power device based on a respective time delay of the respective power device and a maximum time delay of the plurality of power devices.

In another embodiment, a method may include determining, via circuitry, a plurality of time delays associated with a plurality of power devices configured to convert a first voltage into a second voltage. The method may also include identifying, via the circuitry, a maximum time delay based on the plurality of time delays and generating, via the circuitry, a plurality of compensation delays for the plurality of power devices based on the maximum time delay and the plurality of time delays. The method may then send, via the circuitry, a plurality of gate signals to the plurality of power devices, such that each gate signal of the plurality of gate signals comprises a respective compensation delay of the plurality of compensation delays.

In yet another embodiment, a non-transitory computer-readable medium may include computer-executable instructions that cause a circuitry to determine a plurality of time delays associated with a plurality of power devices that converts a first voltage into a second voltage. The circuitry may then identify a maximum time delay based on the plurality of time delays and generate a plurality of compensation delays for the plurality of power devices based on the maximum time delay and the plurality of time delays. The circuitry may also send a plurality of gate signals to the plurality of power devices, such that each gate signal of the plurality of gate signals comprises a respective compensation delay of the plurality of compensation delays.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
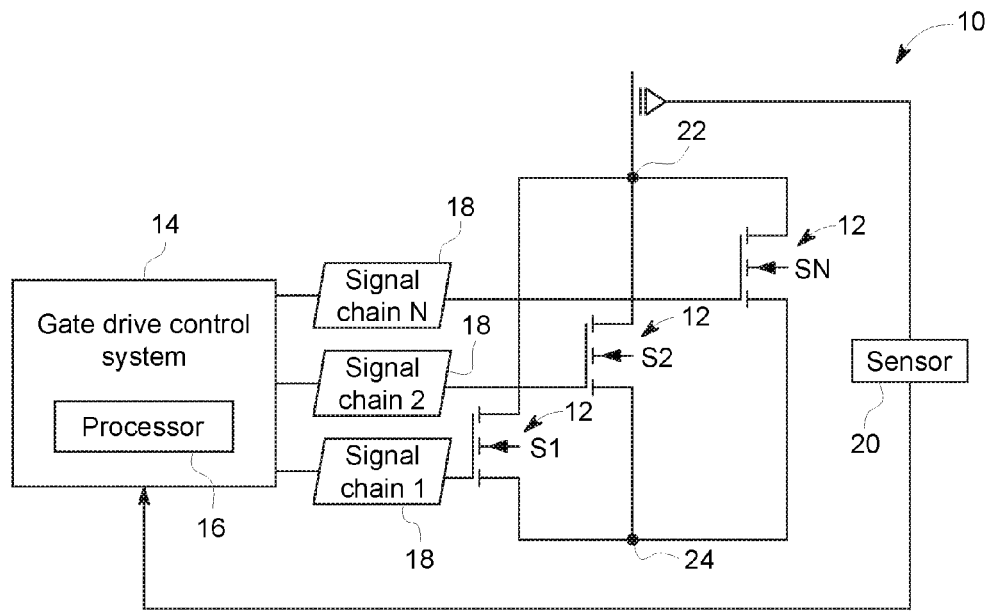
FIG. 1 is a block diagram of a parallel-connected power electronic device system, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements.

Silicon (Si) power electronic devices are widely used in various power conversion systems (e.g., rectifiers, inverters) to convert one form of voltage or current to another form of voltage or current, such as alternating current (AC) voltage/current to direct current (DC) voltage/current (e.g., AC-to-DC, AC-to-AC, DC-to-DC, and/or DC-to-AC, etc.). The performances of the power conversion systems are usually related to the operation frequency and/or switching transient of the power electronic devices. However, silicon-based power electronic devices, such as silicon insulated-gate bipolar transistors (IGBTs), may lose an increasing portion of their energy as heat loss during high-frequency switching. As such, the performance of silicon-based power electronic devices may be limited to some switching frequency (e.g., 1 kHz or below in high-power applications).

In contrast to silicon-based power electronic devices, wide band gap power electronic devices, such as silicon carbide metal-oxide-semiconductor field-effect transistors (MOSFETs) and gallium nitride (GaN) MOSFETs, may exhibit significantly lower switching losses as compared to silicon-based power electronic devices. As such, wide band gap power electronic devices may operate more efficiently than Si power electronic devices when switching frequently (e.g., > tens of kHz) and/or at higher temperatures (e.g., >150° C.).

Although the wide band gap power electronic devices are capable of switching at high frequency rates, when multiple wide band gap power electronic devices are coupled together (e.g., in series, parallel, or series-parallel), the switching of these wide band gap power electronic devices may not be synchronized with each other. That is, the switching of these wide band gap power electronic devices may not occur at desired times and, as a result, the voltage and current sharing between the connected wide band gap power electronic devices may be unbalanced. The inability of these wide band gap power electronic devices to switch at desired times (e.g., synchronized with each other) may be caused due to a mismatch of impedance of gate signal paths for each wide band gap power electronic device, propagation delays within each wide band gap power electronic devices, characteristics difference for each wide band gap power electronic device, and the like.

To ensure that wide band gap power electronic devices switch at desired times (e.g., in synchronous operation with each other), in one embodiment, a gate drive control system may determine a compensation delay time to add to each respective gate signal used to switch a respective power electronic device on or off (e.g., to activate or deactivate the respective power electronic device). In certain embodiments, the compensation delay time may be determined based on a respective delay time associated with each of the power electronic devices within a system and a maximum delay time of all of the respective delay times. After determining the compensation delay time for each respective power electronic device, the gate drive control system may add the respective compensation delay time to each respective gate signal. As a result, each power electronic device may then switch at the desired times and may provide balanced current and voltage sharing between the connected power electronic devices.

With the foregoing in mind, the present disclosure details systems and methods to actively introduce one or more delays (e.g., leading edge delay, falling edge delay, or both) in the gate signals provided to a number of power electronic devices of a system to compensate for the mismatch of timing of the signal paths or the power semiconductors and other factors listed above. In one embodiment, a processor may use a differential voltage signal to control when the delay (i.e., compensation delay) of the gate signals is provided to the connected power electronic devices at a sub-nanosecond level. By employing the systems and techniques described herein, large-scale, parallel/series-connected, high-speed power semiconductors that may be used for rectifiers, inverters, drives, and other power conversion systems can be achieved with balanced voltage/current and sharing properties between each power electronic device of the system.

By way of introduction, FIG. 1 illustrates a block diagram of parallel-connected power electronic system 10, in accordance with an embodiment. As shown in FIG. 1, the parallel-connected power electronic system 10 may include a number of power electronic devices 12 connected in parallel with each other. The power electronic devices 12 may include any type of solid-state electronic device that may switch (e.g., turn off and on) during the conversion of electrical power. For instance, the power electronic devices 12 may include metal-oxide-semiconductor field-effect transistors (MOSFETs), insulated-gate bipolar transistors (IGBTs), and the like. In certain embodiments, the power electronic devices 12 may be composed of semiconductor material such as silicon carbide (SiC) or gallium nitride (GaN). These types of semiconductor materials may enable the power electronic devices 12 switch on and off at high frequency rates (e.g., tens of k Hz) as compared to other power electronic devices composed of other types of semiconductor material (e.g., silicon).

The power electronic system 10 may also include a gate drive control system 14, which may include any type of programmable logic device, such as a controller, a mobile computing device, a laptop computing devices, a general-purpose computing device a field-programmable gate array (FPGA), or the like. In any case, the gate drive control system 14 may control the transmission of gate signals to the power electronic devices 12. Upon receipt of the gate signals, the power electronic devices 12 may turn on or off depending on the voltage present across its respective terminals. In certain embodiments, the power electronic devices 12 may be switched on and off in a manner to provide various power conversion operations. For example, the power electronic devices 12 may convert alternating current (AC) voltage into direct current (DC) voltage, DC voltage into AC voltage, DC voltage into another DC voltage, or AC voltage into another AC voltage. To perform these power conversion operations, the processor 16 may determine when to provide appropriate gate signals to each of the power electronic devices 12 to produce a desired voltage waveform based on a provided input voltage waveform. In addition, the processor 16 may be employed to perform other control functions for the associated power conversion circuitry.

The processor 16 may be any type of computer processor or microprocessor capable of executing computer-executable instructions (e.g., software code, programs, applications). The processor 16 may also include multiple processors that may cooperate to perform the operations described below. Generally, as discussed above, the processor 16 may execute software applications that include programs to determine how to provide gate signals to the power electronic devices 12, such that the resulting voltage output corresponds to a desired voltage signal. For example, FIG. 3, as will be discussed in greater detail below, illustrates an example timing diagram of gate signals provided by the gate drive control system 14 to the respective gates of the power electronic devices 12 of the power electronic system 10.

In certain embodiments, the processor 16 may provide gate signal chains 18 to the power electronic devices 12 to coordinate the switching of each power electronic device 12. The gate signal chain 18 may include one or more pulses that enable the respective power electronic device 12 to turn open and close at scheduled times.

The power electronic system 10 of FIG. 1 may also include a sensor 20. The sensor 20 may be coupled to a common node 22 or 24 of the parallel-connected power electronic devices 12. The sensor 20 may include any type of electronic circuitry that is capable of detecting or measuring a property of a voltage, current, and/or electromagnetic (EM) signal. As such, the sensor 20 may monitor the voltage, current, and/or EM signals generated by the power electronic devices 12 and provide feedback to the gate drive control system 14 regarding the detected signals.

Figure 2:
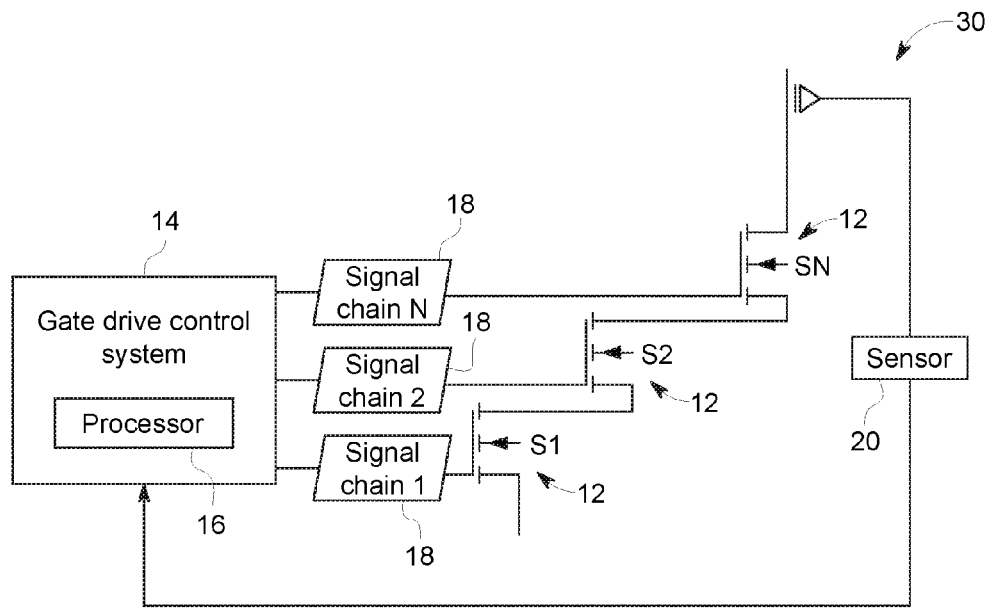
FIG. 2 is a block diagram of a series-connected power electronic device system, in accordance with an embodiment.

Keeping the foregoing in mind, FIG. 2 illustrates a block diagram of a series-connected power electronic system 30. The series-connected power electronic system 30 may also include a number of power electronic devices 12, the gate drive control system 14, the processor 16, and the sensor 20. The gate drive control system 14 may send gate signals, such as gate signal chains 18, to coordinate the switching of the power electronic devices 12. The power electronic devices 12 of the system 30 may be connected in series with each other as shown in FIG. 2. Generally, by connecting the power electronic devices 12 in series with each other, the series-connected power electronic system 30 may be rated for a voltage that corresponds to N times the rated voltage of a single power electronic device 12, where N is the number of power electronic devices 12 in the system 30. In a similar fashion, the power electronic devices 12 of the parallel-connected power electronic system 10 in FIG. 1 may enable the system 10 to conduct N times the rated current for one power electronic device 12, where N is the number of power electronic devices 12.

In either case, due to various differences in the circuits of the system 10 and 30 (e.g., different timing property of signal chain, the delay from the output of the gate drive control system 14 to the gate driver of different power electronic devices 12), the gate signals transmitted to the power electronic devices 12 of the system 10 or 30 may not be received by the respective power electronic device 12 at the desired times. For example, FIG. 3 illustrates an example timing diagram 40 that depicts example delays that various gate signals being transmitted to the power electronic devices 12 of the system 10 or 30 may experience.

Figure 3:
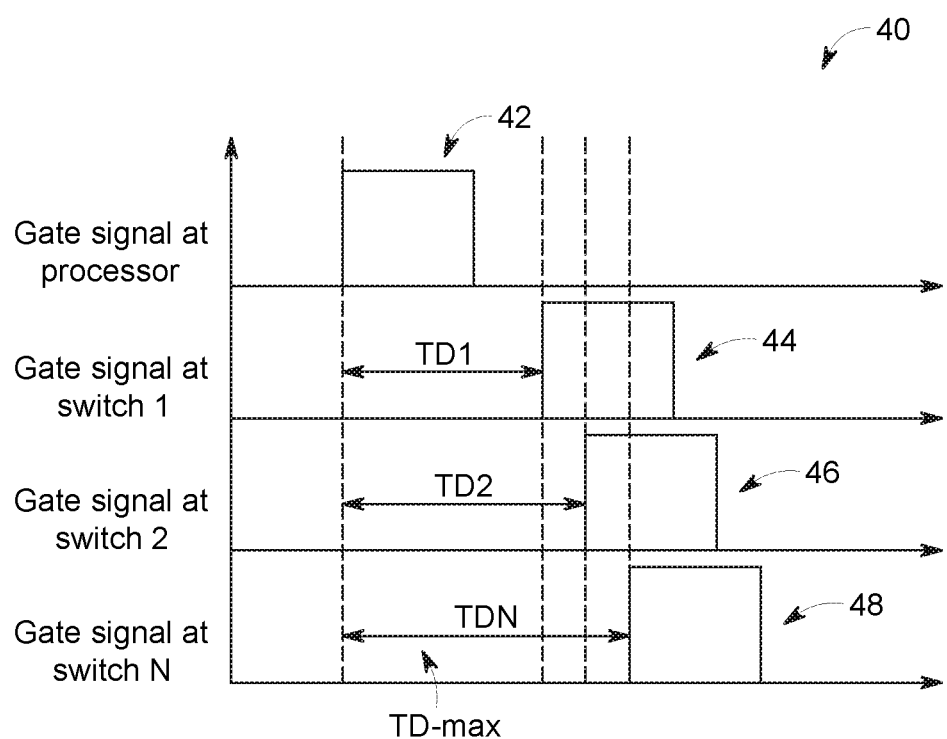
FIG. 3 is a timing diagram of gate signals transmitted to multiple power electronic devices of FIG. 1 or FIG. 2, in accordance with an embodiment.

Referring to the example in FIG. 3, a gate signal 42 at the processor 16 may indicate when the processor 16 generates a gate signal to be provided to the power electronic devices 12. In the same manner, gate signal 44, gate signal 46, and gate signal 48 indicates when each respective gate signal is received by each respective power electronic device 12. As shown in FIG. 3, a delay for a first power electronic device 12 (S1) is represented by TD1, the time delay TD2 is associated with the second power electronic device 12 (S2), and so on.

As for the example provided in FIG. 3, each time delay is smaller than the next. In this case, there may be over-voltage issue in the series-connected power electronic system 30 or an over-current issue in the parallel-connected power electronic system 10. In some cases, to compensate for these time delays, great care may be taken in providing a symmetrical impedance layout design or by adding snubber circuits to the power electronic devices 12. However, in a system where a large number of power electronic devices are connected in series or parallel with each other, it may be difficult to provide a layout with symmetrical impedance. In addition, with the high speed switching operation of the power electronic devices 12, it becomes challenging for snubber circuits to compensate for the time delays of multiple gate signals. Moreover, adding snubber circuits to the system introduces additional power losses and/or weight/size to the system.

With this in mind, in one embodiment, the processor 16 may send the gate signals to the power electronic devices 12 through a differential voltage signal, for example, such as a low voltage differential signal (LVDS). LVDS is a differential signaling system that transmits information as the difference between the voltages on a pair of wires. As such, the gate drive control system 14 may transmit the gate signals via a pair of wires to each power electronic device 12 using a LVDS.

In this manner, LVDS output buffers may be incorporated into the gate drive control system 14 to control the delay of the gate signals output by the processor at a sub-nanosecond timescale. However, to synchronize the gate signals received by the power electronic devices 12, an additional delay at the output of the gate drive control system 14 may be added to each gate signal. However, since each power electronic device 12 may be associated with a different time delay, the processor 16 may first determine a respective compensation delay to add to each gate signal transmitted to each respective power electronic device 12.

Figure 4:
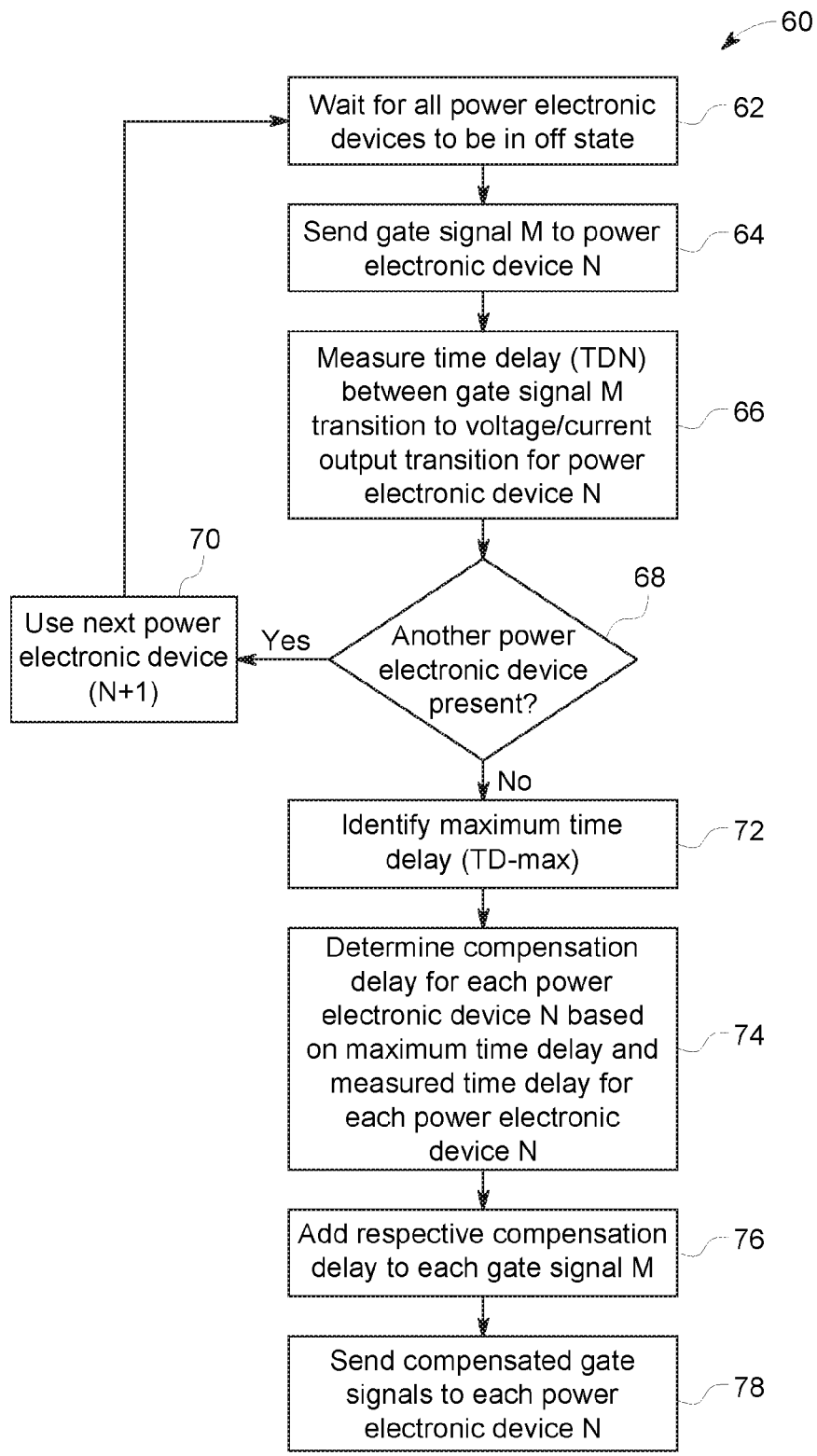
FIG. 4 is a flow chart of a method for sending gate signals to multiple power electronic devices of FIG. 1, in accordance with an embodiment.

With the foregoing in mind, FIG. 4 illustrates a flow chart of a method 60 for sending compensated gate signals to the power electronic devices 12 of the parallel-connected power electronic system 10 of FIG. 1, in accordance with an embodiment. The following description of the method 60 is described as being performed by the processor 16 of the gate drive control system 14. However, it should be noted that any suitable processor device may perform the method 60. Additionally, although the method 60 is depicted in a particular order, it should be noted that the method 60 may be performed in any suitable order and is not limited to the order presented herein.

Referring now to FIG. 4, at block 62, the processor 16 may wait for all of the power electronic devices 12 (e.g., switches) to be in an off (i.e., non-conductive) state. As such, the processor 16 may remove the gate signals being provided to each power electronic device 12.

At block 64, the processor 16 may send a gate signal N to one power electronic device N. The gate signal N may include a pulse having a high signal for some amount of time. After sending the gate signal N to the power electronic device N, at block 66, the processor 16 may measure a time delay (TDN) for the gate signal N to be transmitted to when the voltage or current output of the power electronic device N changes. As such, the processor 16 may use a clock to measure an amount of time between the transmission of the gate signal N to the power electronic device N and the receipt of data indicating a change in current or voltage from the sensor 20. In one embodiment, to avoid the detection of noise from the sensor 20, the processor 16 may stop measuring time when the change in voltage or current detected by the sensor 20 is greater than some threshold.

At block 66, the processor 16 may determine whether another power electronic device 12 is present in the system. If the processor 16 determines that another processor 16 is present, the processor may proceed to block 70 and select the next power electronic device (N+1) to continue the method 60. After selecting the next power electronic device (N+1), the processor 16 may perform operation blocks 62-66 again for the next power electronic device (N+1). As such, the processor 16 may measure a time delay for each of the power electronic devices 12 of the system.

Measurement of the time delay for each power electronic device N may be performed using a single voltage and/or current sensor (e.g., sensor 20) to sense the switching instance of the gate drive and the power electronic device being evaluated. The time delay between the gating of the power electronic device N and the transition of the current and/or voltage output may be timed by the processor 16 using time to digital conversion (TDC) logic, in certain embodiments. For example, TDC techniques can measure time intervals below a clock period using tapped delay line structures. That is, the delay line structures may utilize the low skew clock distribution networks and dedicated adjacent cell routing resources to resolve measurements below 100 pico-seconds.

Referring back to block 68, when the processor 16 determines that another power electronic device 12 is not present in the system, the processor 16 may proceed to block 72. At block 72, the processor 16 may identify a maximum time delay (TD-MAX) based on the time delays measured for each power electronic device N of the system.

Using the maximum time delay (TD-MAX) and the measured time delay (TDN) for each power electronic device N, the processor 16 may, at block 74, determine a compensation delay for each power electronic device 12 of the system. That is, the processor 16 may determine the compensation delay for each power electronic device N based on a difference between the maximum time delay (TD-MAX) and a respective time delay (TDN) for a respective power electronic device N.

By way of example, referring back to FIG. 3, the measured time delays of the power electronic devices S1 to SN are T1 to TDN, respectively, with TDN being greater than TD1 and TD2, and thus TDN=TD-MAX. In this situation, the processor 16 may determine a compensation delay for the first power electronic device (S1) to be equal to the difference between the maximum time delay (TD-MAX) and the measured time delay (TD1) of the first power electronic device (S1). As such, the compensation delay for the first power electronic device (S1) may be expressed as TD-MAX-TD1. In the same manner, the compensation delay for the second power electronic device (S2) may be expressed as TD-MAX-TD2.

Referring back to FIG. 4, after the compensation delay for each power electronic device N is determined, at block 76, the processor 16 may add the respective compensation delay to the respective gate signal N associated with each respective power electronic device N. As such, the processor 16 may, at block 78, delay sending the respective gate signal N to the respective power electronic device N for a period of time equal to the difference between the maximum time delay determined at block 72 and the measured time delay TDN for the respective power electronic device N. By doing so, the gate signals received by each power electronic device 12 of the system 10 may be synchronized with each other.

Figure 5:
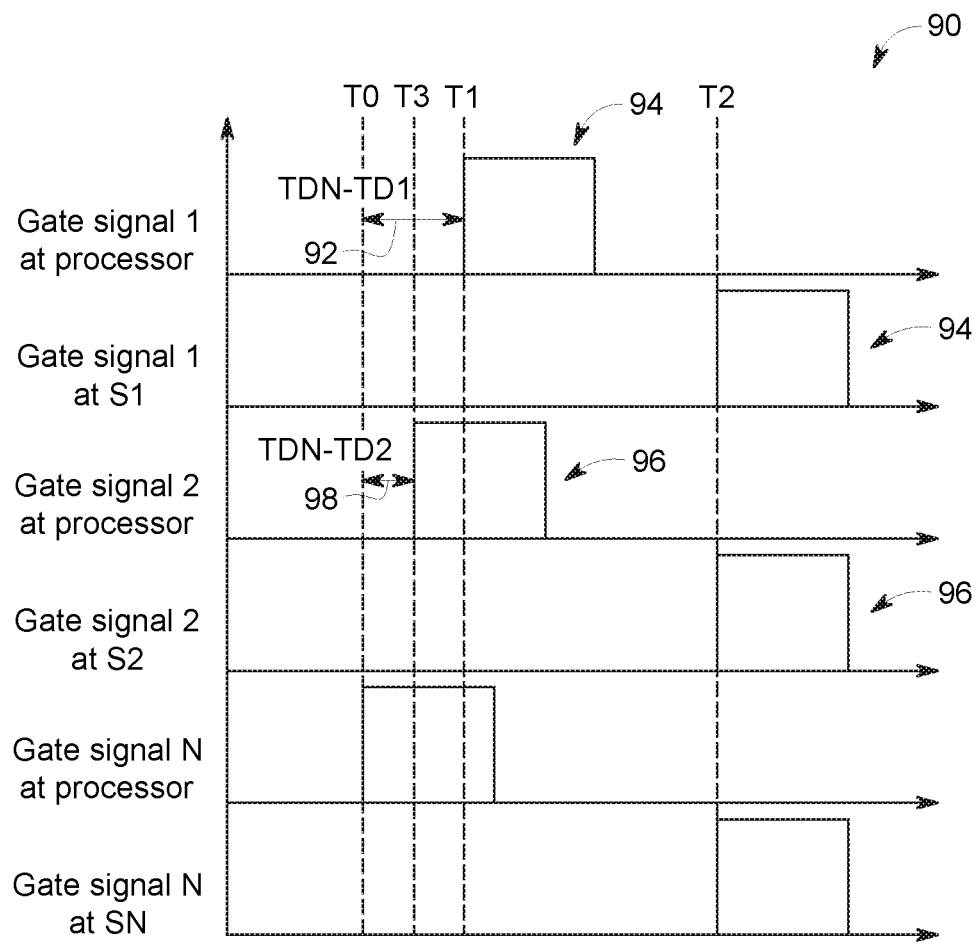
FIG. 5 is a timing diagram of gate signals transmitted to multiple power electronic devices of FIG. 1 or FIG. 2 based on the method of FIG. 4, in accordance with an embodiment.

For example, FIG. 5 illustrates a timing diagram 90 of gate signals transmitted to the power electronic devices 12 based on the method 60 of FIG. 4, in accordance with an embodiment of the present approach. As shown in FIG. 5, the processor 16 may delay the first gate signal 1 to be transmitted to the first power electronic device (S1) from time T0 to time T1 by adding a compensation delay 92 to the gate signal 94, wherein the compensation delay 92 corresponds to the difference between the maximum time delay (TD-MAX) and the measured time delay (TD1) for the first power electronic device (S1). As a result, the first power electronic device (S1) may receive the gate signal 94 at time T2.

In the same manner, the processor 16 may delay the second gate signal 2 (96) to be transmitted to the second power electronic device (S2) from time T0 to time T3 by adding a compensation delay 98 to the gate signal 96, wherein the compensation delay 98 corresponds to the difference between the maximum time delay (TD-MAX) and the measured time delay (TD2) for the second power electronic device (S2). As a result, the second power electronic device (S2) may receive the gate signal 96 at time T2.

By applying the respective compensation delay to each respective gate signal, the processor 16 may ensure that each of the power electronic devices 12 of the system may switch at desired times. That is, the processor 16 may compensate for switching action delay caused by either signal path propagation or device character mismatch between the number of power electronic devices 12 within the system (e.g., as a result of manufacturing variability or changing in the switching behavior of the power electronic devices 12 over their operational lifetimes). Accordingly, present embodiments enable improved voltage and/or current sharing between the power electronic devices 12 for high speed switching applications.

Figure 6:
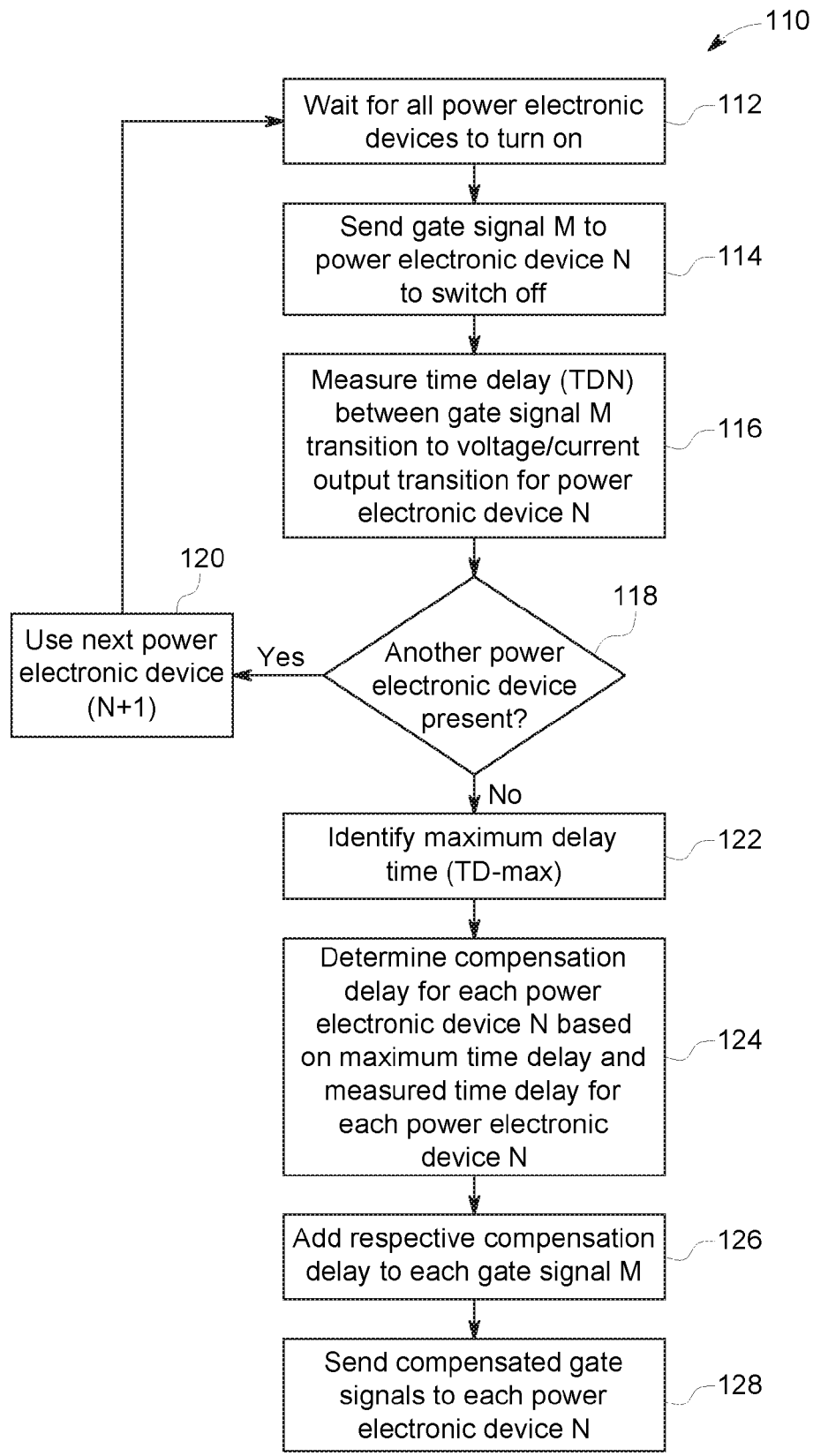
FIG. 6 is a flow chart of a method for sending gate signals to multiple power electronic devices of FIG. 2, in accordance with an embodiment.

In certain embodiments, the method 60 described above may be performed for the power electronic devices 12 of the parallel-connected power electronic system 10. FIG. 6 illustrates a flow chart of a method 110 for sending gate signals to multiple power electronic devices 12 that may be part of the series-connected power electronic system 30, in accordance with an embodiment of the present approach. Like the method 60 of FIG. 4, the following description of the method 110 is described as being performed by the processor 16 of the gate drive control system 14. However, it should be noted that any suitable processor device may perform the method 110. Additionally, although the method 110 is depicted in a particular order, it should be noted that the method 110 may be performed in any suitable order and is not limited to the order presented herein.

Referring now to FIG. 6, at block 112, the processor 16 may wait for the power electronic devices 12 of the system 30 to turn on (i.e., switch to a conductive state). After the power electronic devices 12 are activated, the processor 16 may proceed to block 114 and send gate signal N to the power electronic device N, thereby causing the power electronic device N to turn off (i.e., switch to a non-conductive state).

At block 116, the processor 16 may measure a time delay TDN between when the processor 16 sent the gate signal N and when the voltage or current output of power electronic device N transitioned (similar to the process described above with respect to block 66 of FIG. 4). The processor 16 may then, at block 118, determine whether another power electronic device (N+1) is present in the system 30. If another power electronic device is present, the processor 16 may proceed to block 120 and perform the operation blocks 112-116 using the next power electronic device, N+1.

After measuring the time delay for each power electronic device N of the system 30, the processor 16 may identify the maximum time delay (TD-MAX) at block 122, determine a respective compensation delay for each respective power electronic device of the system 30 at block 124, add a respective compensation delay to each respective gate signal N provided to each respective power electronic device of the system 30 at block 126, and send compensated gate signals to each respective power electronic device of the system 30 at block 128. As such, the operation blocks 122-128 may be performed in a similar manner as explained above with respect to blocks 72-78 of the method 60. By adding the respective compensation delay to each respective gate signal N of each respective power electronic device of the system 30, the processor 16 may better ensure that the series-connected power electronic devices 12 of the system 30 may switch at the desired times. Accordingly, the current and voltage sharing properties of the series-connected power electronic devices 12 of the system 30 may be balanced.

Although the method 60 and the method 110 is described as being performed on parallel-connected power electronic devices 12 and series-connected power electronic devices 12, respectively, it should be noted that the method 60 and the method 110 may also be performed on series-connected power electronic devices 12 and parallel-connected power electronic devices 12, respectively. The method 60 and the method 110 may also be performed by adding a compensation delay to a leading and/or falling edge of the gating signal. Moreover, the method employed by the processor 16 may also be dependent on the type of semiconductor material (e.g., p-type, n-type) within the respective power electronic devices 12.

It should also be noted that, in some embodiments, the method 60 and the method 110 described above may be performed at power up of the associated power conversion system. As such, the processor 16 may initialize or calibrate the gate signals and the power electronic devices 12 to operate synchronously with each other. In some embodiments, the processor 16 may perform the method 60 and/or the method 110 at scheduled times to ensure that the gate signals or delays associated with the power electronic devices 12 have not drifted and to ensure that the power electronic devices 12 remain operating synchronously with each other.

Technical effects of the presently disclosed systems and methods include improved performance of power conversion systems with a number of connected power electronic devices operating together in high frequency switching operations. By implementing the systems and techniques described herein, the power conversion systems may operate more efficiently providing better voltage and current balance between each of the number of power electronic devices employed to perform various power conversion operations.

This written description uses examples to disclose the presently disclosed embodiments, including the best mode, and also to enable any person skilled in the art to practice the invention, including making and using any devices or systems and performing any incorporated methods. The patentable scope of the embodiments presented herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A power conversion system, comprising:
    a plurality of power devices;
    a sensor operably coupled to at least one of the plurality of power devices and configured to detect a voltage, current, or electromagnetic (EM) signature signal associated with the plurality of power devices; and
    circuitry operably coupled to the plurality of power devices and the sensor, wherein the circuitry is configured to send a respective gate signal to each respective power device of the plurality of power devices, and wherein each respective gate signal is delayed by a respective compensation delay that is determined for the respective power device based on a respective time delay of the respective power device and a maximum time delay of the plurality of power devices, wherein the circuitry is configured to identify the maximum time delay from the respective time delays of the plurality of power devices.

2. The power conversion system of claim 1, wherein the circuitry is configured to determine the respective time delay for each power device of the plurality of power devices based on a first time at which a test gate signal is transmitted to the power device and a second time at which the sensor detects a voltage, current, or EM signature change associated with the power device.

3. The power conversion system of claim 1, wherein each of the plurality of power devices is electrically connected in parallel with each other.

4. The power conversion system of claim 3, wherein the gate signal is configured to switch the respective one of the plurality of power devices.

5. The power conversion system of claim 1, wherein each of the plurality of power devices is electrically connected in series with each other.

6. The power conversion system of claim 5, wherein the gate signal is configured to switch the respective one of the plurality of power devices.

7. The power conversion system of claim 1, wherein the circuitry is configured to generate the plurality of compensation delays based on a difference between the maximum time delay and the plurality of time delays.

8. A method, comprising:
    determining, via circuitry, a plurality of time delays associated with a plurality of power devices configured to convert a first voltage into a second voltage;
    identifying, via the circuitry, a maximum time delay based on the plurality of time delays;
    generating, via the circuitry, a plurality of compensation delays for the plurality of power devices based on the maximum time delay and the plurality of time delays; and
    sending, via the circuitry, a plurality of gate signals to the plurality of power devices, wherein each gate signal of the plurality of gate signals comprises a respective compensation delay of the plurality of compensation delays.

9. The method of claim 8, wherein each power device of the plurality of power devices comprises silicon-carbide (SiC) or gallium-nitride semiconductor material.

10. The method of claim 8, wherein determining the plurality of time delays comprises:
    sending a test gate signal to a respective one of the plurality of power devices at a first time;
    receiving a feedback signal from a sensor, wherein the feedback signal indicates that the voltage or current associated with the respective one of the plurality of power devices has changed at a second time; and
    measuring an amount of time between the first time and the second time.

11. The method of claim 8, comprising waiting for the plurality of power devices to be switched before determining the plurality of time delays when each of the plurality of power devices is electrically connected in parallel with each other.

12. The method of claim 8, comprising waiting for the plurality of power devices to be switched before determining the plurality of time delays when each of the plurality of power devices is electrically connected in series with each other.

13. The method of claim 8, wherein generating the plurality of compensation delays comprises determining the plurality of compensation delays based on a difference between the maximum time delay and each time delay of the plurality of time delays.

14. A non-transitory computer-readable medium comprising computer-executable instructions configured to cause circuitry to:
   determine a plurality of time delays associated with a plurality of power devices configured to convert a first voltage into a second voltage;
   identify a maximum time delay based on the plurality of time delays;
   generate a plurality of compensation delays for the plurality of power devices based on the maximum time delay and the plurality of time delays; and
   send a plurality of gate signals to the plurality of power devices, wherein each gate signal of the plurality of gate signals comprises a respective compensation delay of the plurality of compensation delays.

15. The non-transitory computer-readable of claim 14, wherein each power device of the plurality of power devices comprises silicon-carbide (SiC) or gallium-nitride semiconductor material.

16. The non-transitory computer-readable of claim 14, wherein the computer-readable instructions configured to cause the circuitry to determine the plurality of time delays is further configured to cause the circuitry to:
   send a gate signal to a respective one of the plurality of power devices at a first time;
   receive a feedback signal from a sensor, wherein the feedback signal indicates that the voltage or current associated with the respective one of the plurality of power devices has changed at a second time; and
   measure an amount of time between the first time and the second time.

17. The non-transitory computer-readable of claim 14, wherein each of the plurality of power devices is electrically connected in parallel with each other, and wherein the computer-readable instructions are configured to cause the circuitry to wait for the plurality of power devices to be switched before determining the plurality of time delays.

18. The non-transitory computer-readable of claim 14, wherein when each of the plurality of power devices is electrically connected in series with each other, and wherein the computer-readable instructions are configured to cause the circuitry to wait for the plurality of power devices to be switched before determining the plurality of time delays.

19. The non-transitory computer-readable of claim 14, wherein the computer-readable instructions are configured to cause the circuitry to generate the plurality of compensation delays by determining on a difference between the maximum time delay and each time delay of the plurality of time delays.

* * * * *